July 20, 1926.

I. REESE

COOKING UTENSIL

Filed March 28, 1924    2 Sheets-Sheet 1

1,593,101

WITNESS
G. V. Rasmussen

INVENTOR
ISAAC REESE
BY
Niesen Schrenk
ATTORNEYS

July 20, 1926.

I. REESE

COOKING UTENSIL

Filed March 28, 1924   2 Sheets-Sheet 2

1,593,101

WITNESS
G. V. Rasmussen

INVENTOR
ISAAC REESE
BY
Niesen Schrenk
ATTORNEYS

Patented July 20, 1926.

1,593,101

UNITED STATES PATENT OFFICE.

ISAAC REESE, OF WELLSVILLE, NEW YORK, ASSIGNOR TO VICTOR ALUMINUM MFG. CO., OF WELLSVILLE, NEW YORK, A CORPORATION OF NEW YORK.

COOKING UTENSIL.

Application filed March 28, 1924. Serial No. 702,495.

My invention relates to cooking utensils and more particularly to that type thereof in which coffee is prepared for drinking and has for its object to provide a utensil of novel construction whereby beverages, and principally coffee, may be produced in an economical and efficient manner. Other more specific objects will appear from the description hereinafter.

Figure 1:
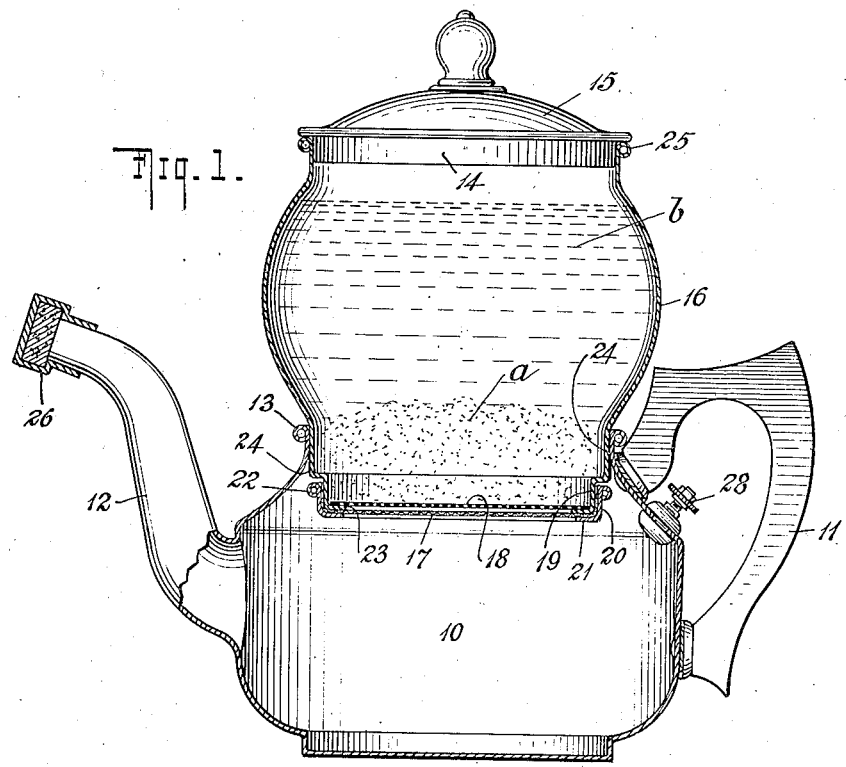
Figure 2:
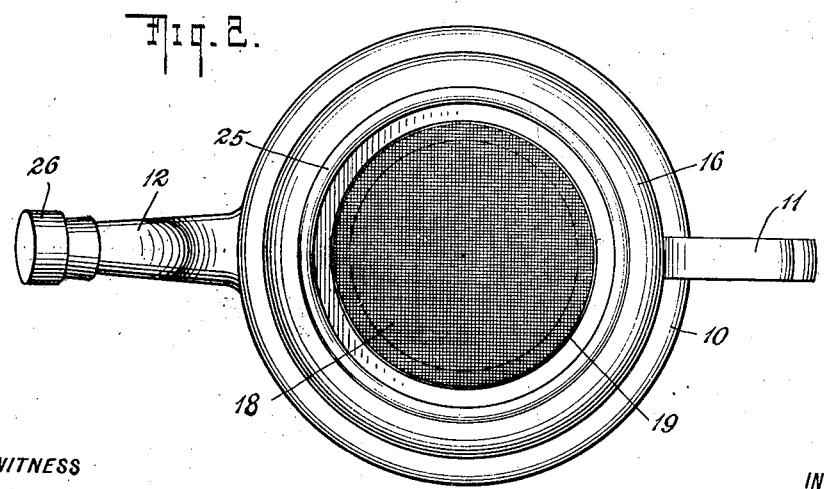
Figure 3:
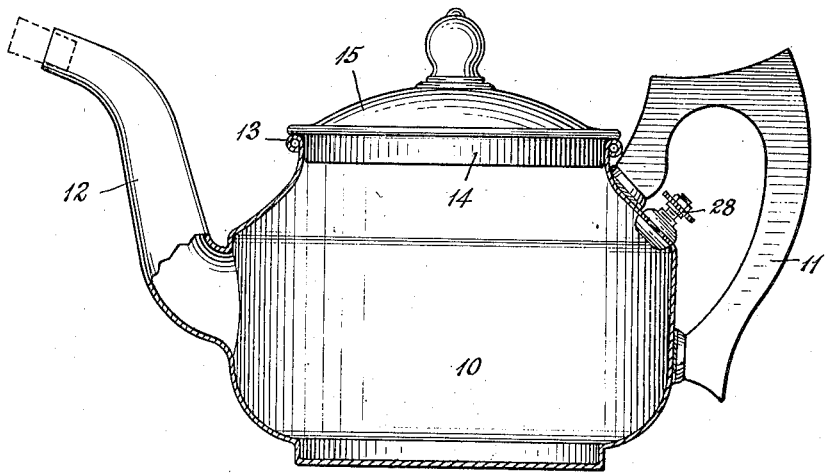
Figure 4:
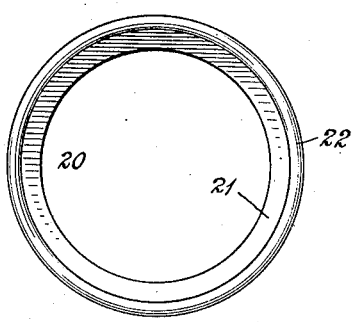
Figure 5:
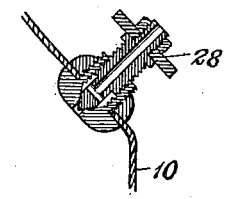

In the accompanying drawing, which shows an example of the invention without defining its limits, Fig. 1 is a sectional elevation of the utensil; Fig. 2 is a plan view with the cover removed; Fig. 3 is a sectional elevation of the utensil with the upper section removed; Fig. 4 is a detail view of a clamping ring included in the utensil and Fig. 5 is a detail section of an air valve thereof.

As shown in the drawings the utensil comprises a main section or pot 10 having the customary handle 11 and spout 12 through which the contents may be poured, the pot 10 is further provided with an opening, the periphery of which may be beaded as shown at 13 and which is adapted to receive the flange 14 of a cover 15 whereby the pot 10 is closed under certain conditions of use to be more fully set forth hereinafter.

An auxiliary section or receptacle 16 is adapted to be superimposed upon the pot 10 as shown in Fig. 1 and has its lower open end closed by means of a percolating means which may consist of a fabric section 17 stretched across said open end or a foraminous sheet 18 supported interiorly of said receptacle 16 to close said lower end; in some cases the percolating means may consist of both the fabric section 17 and the foraminous sheet 18 located in superimposed, surface relating to each other as illustrated in Fig. 1. For the purpose of stretching and holding the fabric section 17 in place, the receptacle 16 may be provided with an annular depending flange 19 over which the fabric section 17 is folded and upon which it is clamped by means of a clamping ring 20 as shown in Fig. 1; the clamping ring 20 in its preferred form is provided with an inwardly extending annular flange 21 which not only finishes off the construction but improves the support of said fabric section 17 and said ring may further include an annular bead 22 to facilitate the removal of the ring when this is desired. The receptacle 16 is further provided with an internal annular flange 23 extending inwardly in a horizontal direction over the inner surface of said fabric section 17 as shown in Fig. 1; this internal flange 23 provides a rest for the foraminous sheet 18 and supports the same independently of the fabric section 17. The lower end of the receptacle 16 is provided with a slightly tapering portion 24, the outer diameter of which is such that it snugly fits within the opening 13 and thereby fixes the auxiliary section or receptacle 16 in position upon the main section or pot 10 as shown in Fig. 1. The upper end of the receptacle 16 is provided with an opening, the periphery of which is preferably also beaded as shown at 25 and which is of a diameter corresponding to that of the opening 13 in order to receive the flange 14 of the cover 15 when the latter is used to close said receptacle 16 in the completely assembled condition of the utensil illustrated in Fig. 1.

The utensil further includes a closure 26 whereby the exit end of the spout 12 may be closed for the purpose appearing more fully further on in the description; this closure may comprise a cork adapted to be inserted into the exit end of said spout or as is preferred said closure may comprise a cap provided with an internal cork or similar element 27 and arranged to fit over the spout 12 with the cork 27 against and closing said exit end as shown in Fig. 1.

In the preferred construction the main section or pot 10 is provided with an air valve 28 adapted to be opened or closed to control the communication with the interior of said pot and the atmosphere in the complete operative condition of the utensil.

In practice, when it is desired to use the utensil for making coffee, the auxiliary section 16 is fitted into the main section 10 by inserting and forcing the tapering portion 24 into the opening 13; in this way an air-tight connection between the two sections is secured. The cap 26 or equivalent closure having been placed in position to close the exit end of the spout 12 and the air valve 28 having been adjusted to its closed position, a supply of coffee $a$, either ground or otherwise prepared, is placed in the receptacle 16 so as to rest upon the percolating means 17 or 18. A quantity of boiling water $b$ sufficient for the purpose is now poured into the receptacle 16 and upon the coffee contained therein after which the cover 15 is placed upon the receptacle 16 to close its open end 25.

In this fully assembled condition shown in Fig. 1, the interior of the utensil is airtight and an air cushion is formed in the main section or pot 10 which acts through the percolating means upon the water and forces it to remain in the receptacle 16; the water therefore does not percolate through the percolating means 17 or 18 or both as long as the utensil is sealed. As a result of this the coffee a is steeped in the water b to any predetermined extent and for any given period of time to provide the desired strength in the finished beverage. After the steeping period has passed, the cap 26 or equivalent closure is removed from the spout 12 whereby the air cushion in the main receptacle or pot 10 is relieved and its restraining force accordingly removed from the water. As a result of this, the liquid resulting from steeping of the coffee in the water begins to percolate through the percolating means 17 or 18 or both, into the pot 10 which finally contains the full supply of pure coffee or other beverage resulting from the steeping operation, said coffee or other beverage being perfectly clear and free from grounds or the like.

If it is now desired to pour this beverage from the pot 10, while the utensil is in its completely assembled condition, this may be done by simply adjusting the valve 28 to its open position to admit air to the main section or pot 10. In order, however, to avoid the necessity for manipulating the completely assembled utensil when pouring the coffee or other beverage, the auxiliary section or receptacle 16 may be removed and the cover 15 placed upon the main section or pot 10 to close the opening 13 thereof, as shown in Fig. 3. In this condition only the pot 10 itself is required to be manipulated to pour the contents thereof.

In any case the pot, at the finish of the brewing operation, contains only a pure beverage resulting from the steeping of the coffee in the hot water plus the extracting action of the latter in finally percolating through the coffee and percolating means into the pot 10; in other words this double action results in complete infusion of the coffee and consequently provides a beverage of maximum quality with a minimum amount of coffee. The same is true of such other beverages as are capable of being made in the present cooking utensil.

Various changes in the specific form shown and described may be made within the scope of the claims without departing from the spirit of the invention.

I claim:—

1. A cooking utensil comprising a pot having a spout and an upper opening, a receptacle fitted into said opening in an airtight manner and having an open lower end in communication with said pot and an upper opening, percolating means at the lower end of said receptacle adapted to support a supply of coffee therein, a cover arranged to selectively fit the openings of said pot and receptacle and adapted to close the receptacle in the fully assembled condition of the utensil and to close the pot when the receptacle is removed therefrom, and a closure for closing said spout to seal the utensil and provide an air cushion in said pot and thereby prevent water in the receptacle from entering the pot and maintain a supply of water in said receptacle in which said coffee is steeped for a predetermined period of time.

2. A cooking utensil comprising a pot having a spout and an upper opening, a receptacle fitted into said opening in an airtight manner and having an open lower end in communication with said pot and an upper opening, percolating means at the lower end of said receptacle adapted to support a supply of coffee therein, a cover arranged to selectively fit the openings of said pot and receptacle and adapted to close the receptacle in the fully assembled condition of the utensil, and a closure for closing said spout to seal the utensil and to close the pot when the receptacle is removed therefrom, and provide an air cushion in said pot and thereby prevent water in the receptacle from entering the pot and maintain a supply of water in said receptacle in which said coffee is steeped for a predetermined period of time and an air valve adapted to admit air to said pot to permit the beverage to be poured therefrom in the fully assembled condition of the utensil.

3. A cooking utensil comprising a lower section, an upper section superimposed upon said lower section and communicating therewith, said upper section being adapted to contain an ingredient steeped in a liquid and means whereby the air in said lower section is sealed to provide an air cushion therein whereby said liquid is prevented from entering said lower section and is maintained in said upper section for a predetermined period of time and an air valve in the lower section adapted to admit air to said lower section to permit liquid to be poured therefrom in the fully assembled condition of the utensil.

In testimony whereof I have hereunto set my hand.

ISAAC REESE.